United States Patent [19]

Iwakura

[11] Patent Number: 4,479,132

[45] Date of Patent: Oct. 23, 1984

[54] THERMAL PRINTER

[75] Inventor: Sadao Iwakura, Tokyo, Japan

[73] Assignee: Canon Kabushiki Kaisha, Tokyo, Japan

[21] Appl. No.: 512,570

[22] Filed: Jul. 11, 1983

Related U.S. Application Data

[63] Continuation of Ser. No. 269,972, Jun. 3, 1981, abandoned.

[30] Foreign Application Priority Data

Jun. 13, 1980 [JP] Japan .................................. 55-78963

[51] Int. Cl.³ .............................................. G01D 15/10

[52] U.S. Cl. ................................................ 346/76 PH

[58] Field of Search .................... 346/76 PH; 219/216; 400/120

[56] References Cited

U.S. PATENT DOCUMENTS 4,246,587 1/1981 Reilly et al. ............... 346/76 PH X 4,271,414 6/1981 Williams et al. ............... 346/76 PH 4,284,876 8/1981 Ishibashi et al. ........... 346/76 PH X 4,309,712 1/1982 Iwakura ......................... 346/76 PH

FOREIGN PATENT DOCUMENTS 2457771 1/1981 France ........................... 346/76 PH

*Primary Examiner*—Gene Z. Rubinson

*Assistant Examiner*—W. J. Brady

*Attorney, Agent, or Firm*—Fitzpatrick, Cella, Harper & Scinto

[57] ABSTRACT

There is disclosed a thermal printer with memory to memorize pattern information which has previously been printed by a thermal head, a converter connected to the memory and to convert the pattern information memorized in the memory into time information, and a device connected to the converter and to cause new pattern information to be printed by the thermal head on the basis of the timing signal to be obtained from the converter.

6 Claims, 2 Drawing Figures

THERMAL PRINTER

This application is a continuation of application Ser. No. 269,972 filed June 3, 1981, now abandoned.

BACKGROUND OF THE INVENTION

1. Field of the Invention

This invention relates to a thermal printer, and, more particularly, to a control system for maintaining a surface temperature of the thermal head at a predetermined level.

2. Description of the Prior Art

In the case of printing letters and characters by a printer using a thermal head, if it is done by electric conduction for a certain definite time period through each dot of the thermal head, the surface temperature of the head at the time of printing tends to vary depending on the temperature of the same before the printing. For instance, the surface temperature of the thermal head, when effecting electric conduction thereto for a certain definite time period, differs between the following two situations: where the temperature of the head has lowered to an ambient temperature due to its having not been used for a certain period of time and where the surface temperature of the head has already risen to a certain level owing to its continuous use by that time. As the consequence of this, there occurs irregularity in the heat quantity to be imparted to heat-sensitive paper and image transfer tape, which makes it difficult to obtain the print of a uniform density, hence inferior print quality.

SUMMARY OF THE INVENTION

It is an object of the present invention to provide a surface temperature control system for the thermal print head which eliminates the abovementioned disadvantages, and is capable of maintaining the surface temperature of the head at a constant level.

It is another object of the present invention to provide a surface temperature control system for the thermal print head incorporated in a printer that performs the printing operation using the same, the system comprising memory means for memorizing dot information which has previously been printed by the thermal print head, and the electric conduction time to the thermal print head being variably controlled in accordance with the dot information memorized in the memory means so as to maintain the surface temperature of the thermal print head at a constant level.

According to the present invention, the dot information which has previously been printed is memorized in a shift register, then the stored information is converted into analog signals by a digital-analog converter, and the electric conduction time to the head is variably controlled by the analog signals to maintain the surface temperature thereof at a constant level, thereby keeping the print quality always at the optimum state.

DESCRIPTION OF THE PREFERRED EMBODIMENTS

In the following, the present invention will be explained in detail in reference to the accompanying drawing.

Figure 1:
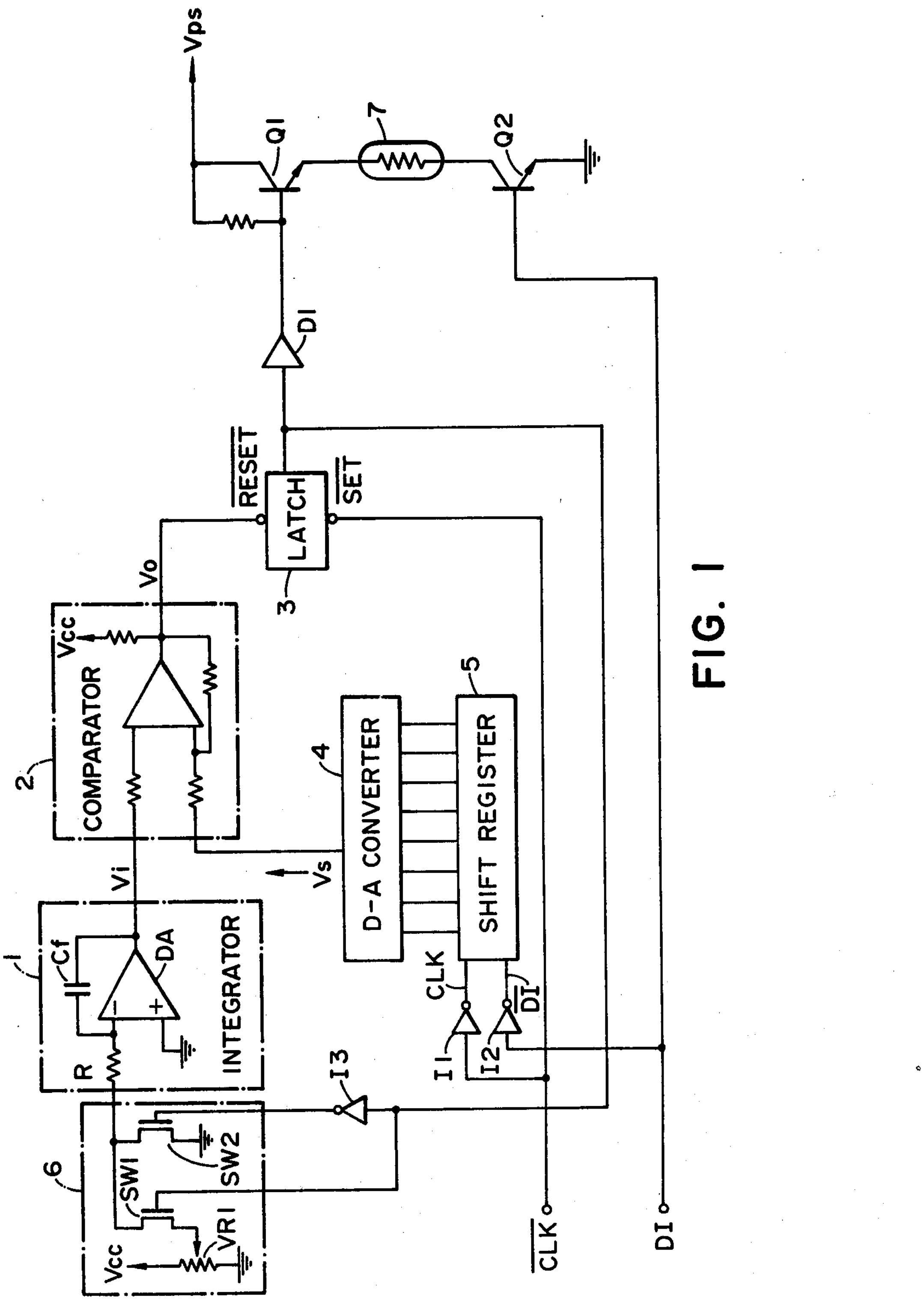
FIG. 1 is a block diagram showing one embodiment of the surface temperature control system for the thermal print head according to the present invention.

Referring first to FIG. 1 showing a block diagram of one embodiment of the present invention, a reference numeral 1 designates an integrator consisting of a differential amplifier DA, a resistor R, and a capacitor Cf, wherein an input voltage thereto is integrated in accordance with a time constant of the resistor R and the capacitor Cf, and a waveform resulted from the integration is forwarded as an output from the differential amplifier DA. A numeral 2 refers to a comparator, an output Vo of which reverses when an input voltage Vi from the integrator 1 becomes higher than a reference voltage Vs to be obtained from a digital-analog converter (hereinafter abbreviated as "D-A converter") 4. A numeral 3 refers to a latch, to which the output voltage Vo from the comparator 2 is applied to its $\overline{\text{Reset}}$ terminal and a clock signal $\overline{\text{CLK}}$ to its $\overline{\text{Set}}$ terminal, whereby the comparator output Vo is latched by a timing of the clock signal $\overline{\text{CLK}}$ to set the electric conduction time in the thermal print head 7.

The D-A converter 4 produces the variable reference voltage output Vs which is proportional to an output from a shift register 5. The shift register 5 is supplied with a signal CLK and a signal $\overline{\text{DI}}$ resulted from inversion of the clock signal $\overline{\text{CLK}}$ and the dot information DI by an inverter I1 and an inverter I2, respectively, and the inverted dot information $\overline{\text{DI}}$ is sequentially stored with a timing of the CLK signal. It should be understood that this shift register 5 has dot numbers capable of storing the dot information sufficient to follow the temperature changes in the thermal head 7.

A reference numeral 6 designates a voltage output section to output the input voltage from the integrator 1, which serves to apply an output from the latch 3 direct to an analog switch SW1, and simultaneously apply the same output to an analog switch SW2 through an inverter I3. A variable output voltage from a variable resistor VR1 is applied to the analog switch SW1 to close it and open the analog switch SW2, when the latch output is at a high level, thereby transferring the output from VR1 to the integrator 1. The analog switch SW2 is closed when the latch output is at a low level, and applies a low level output of a common potential to the integrator 1.

Output transistors Q1 and Q2 are serially connected with the thermal head 7 to supply a power source voltage Vps to the collector of the output transistor Q1, while grounding the emitter of the output transistor Q2. Further, an output from the latch 3 is supplied to the base of the output transistor Q1 through a driver D1 to control the electric conduction time to the thermal head 7, and, at the same time, the dot information DI is applied to the base of the output transistor Q2, whereby the thermal head 7 is able to print the dot information DI during the period of the electric conduction time to be determined by the latch 3.

In the following, the operations of the thermal head control device shown in FIG. 1 will be explained in reference to the timing chart in FIG. 2. When the output dot information DI is produced in synchronism with the clock signal CLK, the dot information DI is introduced as an input into the shift register 5 through the inverter I1 with a timing of the clock signal CLK.

When the subsequent output dot information DI is produced, the previous dot information in the shift register 5 sequentially performs the right shifting, whereby new dot information is introduced as the input into the shift register 5. As the result of this, there will be memorized in the shift register 5 the previously printed dot information in a length corresponding to this register. The output from this shift register 5 becomes an input into the D-A converter 4 which produces the voltage Vs proportional to the contents of the shift register 5. When the thermal head 7 is subjected to electrical conduction with the printing information DI to the thermal head 7 being at a high level, an inverted dot information DI is introduced as an input into the shift register 5 through the inverter I2, whereby the shift register 5 assumes a low level. In other words, when the thermal head 7 is frequently subjected to the electrical conduction with the dot information DI being at a high level, the contents in the shift register 5 are mostly at a low signal level with the consequence that the input into the D-A converter 4 is mostly at a low level. Accordingly, the output voltage Vs from the D-A converter 4 assumes the low level. Conversely, when the dot information DI assumes the low level, and the thermal head 7 is subjected to less frequent electric conduction, the output voltage Vs from the D-A converter 4 becomes inversely high.

Figure 2:
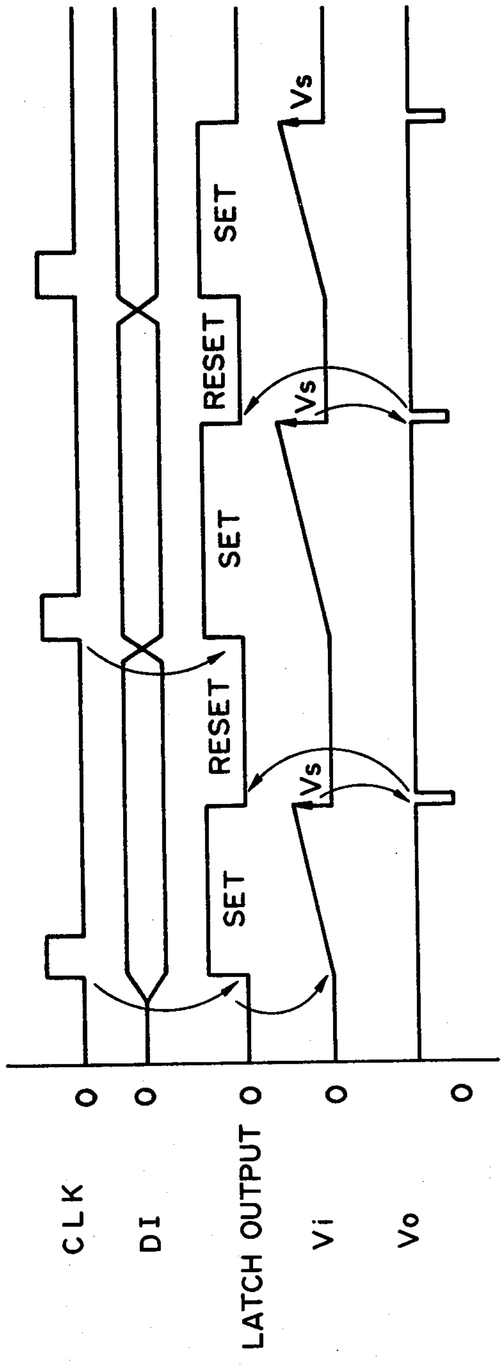
FIG. 2 is a timing chart indicating states of signals at each section of the system shown in FIG. 1.

Now, when the output dot information DI is produced in synchronism with the clock signal $\overline{CLK}$, the latch 3 is set by the clock signal CLK as shown in the timing chart of FIG. 2 to enable the electrical conduction to be effected to the thermal head 7. With an output from this latch 3, a voltage to be determined by the variable resistor VR1 is applied from the analog switch to an input terminal of the integrator 1. The integrator 1 produces an output Vi in an integrated waveform having a gradient following the time constant. In the comparator 2, the output from the integrator 1 is compared with the reference voltage Vs determined by the D-A converter 4. When the output voltage Vi of the integrator 1 is higher than the reference voltage Vs, the output from the comparator 2 changes to a low level. With this low level output, the latch 3 is reset, and the electric conduction to the thermal head 7 is interrupted. At the same time, the output from the analog switch, hence the input into the integrator 1, is brought to a low level by the low level latch output, and its output Vi also assumes the low level. Accordingly, after lapse of a short time period, the output Vo from the comparator 4 returns to a high level from its previous state of low level.

When the printing operation is done in such a manner as mentioned in the foregoing, if the amounts of the printing information before that are numerous, there will be applied many low level signals as the inverted dot information DI. In this consequence, the time period required for the reference voltage Vs of the D-A converter 4 to be low and the output voltage Vi from the integrator 1 to be higher than the reference voltage Vs becomes short. On account of this, the printing time of the thermal head 7 is shortened. Conversely, when the amounts of the printing information before that are small, the reference voltage Vs of the D-A converter 4 becomes high, and a time period required for the output voltage Vi from the integrator 1 to be higher than the reference voltage Vs becomes long, hence the printing time by the thermal head 7 becomes long.

Thus, the present invention makes it possible that, when there are many amounts of previous printing information and the thermal head 7 is subjected to frequent electrical conduction, hence the surface temperature of the thermal head 7 is high, the contents of the shift register 5 are mostly at a low level and the reference voltage Vs of the D-A converter 4 assumes a low level, owing to which the electric conduction time is shortened and excessive electric conduction to the thermal head 7 can be avoided, thereby preventing the surface temperature of the thermal head 7 from increasing. On the contrary, when there are less amounts of previous printing information, the contents of the shift register 5 is mostly at a high level and the output voltage Vs of the D-A converter 4 becomes high, owing to which the electrical conduction time to the thermal head 7 becomes long and sufficient amount of heat can be applied to the thermal head.

As stated in the foregoing, according to the present invention, it is possible that, in either case of continuous or intermittent supply of the printing information to the thermal head, such printing information is memorized by the shift register, the conduction time is made automatically variable by the memorized content, and the surface temperature of the thermal head is maintained constant, whereby the print quality can always be kept in the optimum condition.

What I claim is:

1. A thermal printer comprising:
(a) memory means for memorizing pattern information which has previously been printed by a thermal head;
(b) a D-A converter connected to said memory means;
(c) a comparator for comparing an output from an integrator and an output from said D-A converter;
(d) a latch connected to and controlled by said comparator, said latch applying an output therefrom to said integrator; and
(e) means for controlling printing of new pattern information by a signal memorized in said latch.

2. The thermal printer as set forth in claim 1, wherein said memory means includes a shift register.

3. The thermal printer as set forth in claim 1, wherein said memory means is a first-in first-out memory.

4. The thermal printer as set forth in claim 3, wherein said D-A converter produces corresponding analog signals as output in accordance with a plurality of the pattern information.

5. A thermal printer, comprising
a thermal head;
memory means for storing in time series a plurality of print information supplied in time series to said thermal head, and for outputting in parallel said print information as subsequent print information is stored in time series therein;
converting means for receiving said print information output in parallel from said memory means, and for effecting digital-analog conversion thereof; and
control means for controlling a drive time of said thermal head in accordance with the subsequent print information based on the analog value obtained by said converting means.

6. A thermal printer as set forth in claim 5, wherein said memory means includes a shift register.

* * * * *